United States Patent [19]

Herrmann

[11] Patent Number: 4,600,466

[45] Date of Patent: Jul. 15, 1986

[54] HAND ROLLER FOR THE APPLICATION OF METAL FOILS TO THE EDGES OF FLAT GLASS ARTICLES

[76] Inventor: Heinz Herrmann, Leipziger Str. 105, 4154 Tönisvorst, Fed. Rep. of Germany

[21] Appl. No.: 670,531

[22] Filed: Nov. 13, 1984

[30] Foreign Application Priority Data

Nov. 12, 1983 [DE] Fed. Rep. of Germany ... 8332604[U]

[51] Int. Cl.[4] .......... B32B 35/00

[52] U.S. Cl. .......... 156/391; 156/468; 156/486; 156/574; 156/579; 156/584

[58] Field of Search .......... 156/579, 584, 577, 574, 156/527, 523, 468, 391, 486

[56] References Cited

U.S. PATENT DOCUMENTS

| | | | |
|---|---|---|---|
| 3,468,743 | 9/1969 | Soriano | 156/527 |
| 3,671,364 | 6/1972 | Guinan | 156/574 |
| 3,829,346 | 8/1974 | Sullivan | 156/577 |
| 4,496,049 | 1/1985 | Pabodie et al. | 156/577 |

*Primary Examiner*—Michael Wityshyn

*Attorney, Agent, or Firm*—Karl F. Ross; Herbert Dubno

[57] ABSTRACT

A tool for the rolling of a metal foil onto the edge of a glass article in a wrinklefree manner comprises an elongated handle having a blade at one end of a guide path for the foil which peels the masking strip away from the adhesive layer of the foil and a pressing pin at the opposite end of the guide path which presses the foil against the edge of the glass.

17 Claims, 6 Drawing Figures

HAND ROLLER FOR THE APPLICATION OF METAL FOILS TO THE EDGES OF FLAT GLASS ARTICLES

FIELD OF THE INVENTION

My present invention relates to a hand roller for the application of metal foils to the edges of flat glass articles and, more particularly, to the application of copper foils to the edges of glass sheet fragments which may have been cut in predetermined patterns from the glass sheet to facilitate the production of leaded glass and the like.

BACKGROUND OF THE INVENTION

In the production of ornamental glass articles, it is common practice to cut sections of the pattern to be assembled from variously colored and variously textured glass sheets or panes and to assemble the sections in a predetermined orientation and pattern in the production of stained glass and leaded glass.

In particular, along the eges of each glass section, the copper foil is applied so that the edges of the foil overlap the faces of the article while the edge of the article is completely encased by the foil. The foil is available in rolls and has on its inner surface an adhesive coating of a pressure-sensitive adhesive which is covered by a masking or protective layer, e.g. of paper, which can be treated with a parting compound to facilitate the separation of the paper from the adhesive.

In the production of ornamental glass objects in the afore-described manner, the protective strip is removed from the adhesive backing of the foil and the foil is pressed as uniformly as possible against the edge so that the margins of the foil project outwardly. These overhanging margins are then pressed back onto the broad faces of the glass article.

When two such foil-edged glass sections are brought together and solder is applied with the aid of a soldering iron or a soldering gun, following the application of a flux, the solder is drawn into the interface between the foil covered edges by capillarity and the solder coats the margins of the foil strips applied to the edges of the two articles so that, upon hardening, the two articles are held in place in a channel formed from the solder and the copper edgings, thereby producing the "leaded" glass article.

As anyone who has ever applied such copper foil edgings to glass articles can testify, it is practically impossible by purely finger application techniques to avoid crimping and wrinkling of the copper foil and hence the formation of irregularities which can result in a lack of proper adherence of the foil to the glass, problems with respect to the close soldering of two foil-covered edges, and proper positioning of the various glass sections.

As far as I am aware, there has been no manually effective way to prevent these problems.

OBJECTS OF THE INVENTION

It is the principal object of the present invention, therefore, to provide a device which can facilitate the wrinkle-free and crinklefree application of such foil strips to the edges.

Another object of the invention is to provide a handrolling device which can apply copper foil strips and other metal foils, backed with a pressure-sensitive adhesive and from which a masking strip is removed, to the edges of colored glass sections which are to be joined together, e.g. by soldering, in the production of ornamental glass, i.e. leaded or stained glass articles.

SUMMARY OF THE INVENTION

These objects and others which will become apparent hereinafter are attained, in accordance with the present invention, in a hand roller for applying metal foils to the edges of glass sheet sections which comprises an elongated body or member formed with a guide path for the metal foil, pressing means at one end of the guide path for applying a foil to the edge of the glass article, and a blade at an opposite end of this path for separating the protective strip or masking strip from the adhesive coated surface of this foil.

When reference is made to the ends of the path, it should be noted that this can mean that pressing means is located above the blade or that, however the path is oriented, the pressing means and the blade are located in spaced-apart relationship. The path can be such that neither the pressing means nor the blade, while being disposed at opposite ends of the path, need lie in the plane of the path and the pressing means can be located above the path, for example, while the blade can be located below the path.

With the hand roller of the invention, after an initial stretch of stripped metal foil is fed along the path, the portion of the foil in the vicinity of the pressing means simply can be used to apply or "roll" the strip onto the edge of the glass article, whether or not any member actually rotates, the strip being drawn along this path as the hand roller is moved along the edge of the glass article.

As additional portions of the strip are drawn along the path, the blade automatically peels off the masking layer. The elongate or barlike shape of the hand roller facilitates the feed of the foil along the path and its entrainment therealong in use without wrinkling or crimping. The barlike handle can have a rectangular or, in a special case, a square cross section so as to be easily held in the hand.

In the best-mode embodiment of the invention, the path is a straight path extending through the handle and hence the blade is formed on the front end thereof.

The guide path can be planar and at least partly covered at the top of the handle so that the status of the foil can be viewed through an elongated window formed along the top of the handle and communicating with the guide path. Other arrangements in which the guide path is recessed in the handle can also be used.

The pressing means can be a pin which preferably has a circular cross section and extends transversely to the guide path but parallel to the plane thereof, this pin extending between cheeks or flanks of the bar which define a mouth at which the copper strip emerges from the guide path to be pressed against the edge of the glass article.

This pin can be disposed above and can close the guide path from above, or can be processed so that it extends into a cavity in the guide plane.

The pin can be formed as a rib in one piece with the handle when the latter is molded unitarily in one piece from a synthetic resin. The blade can also be formed in one piece with the handle.

I have found it to be advantageous to provide at the aforementioned mouth a slot which extends generally horizontally through the guide plane and through which the edge of the glass article can pass. This allows the flanks to form a guide for the edge of the article so that with application of the foil strip undesirable relative movements of the tool or article cannot occur even involuntarily and the foil is thus constantly applied in a repeated centered orientation to the edge.

Advantageously, the width of the guide slot is adjustable, i.e. by providing a screw which spans the flanks of the guide line and can draw these flanks toward one another or apart.

The tension screw thus forms a means for adjusting the slot width to suit the glass article thickness.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figures 1, 2, 3, 4, 5, 6:
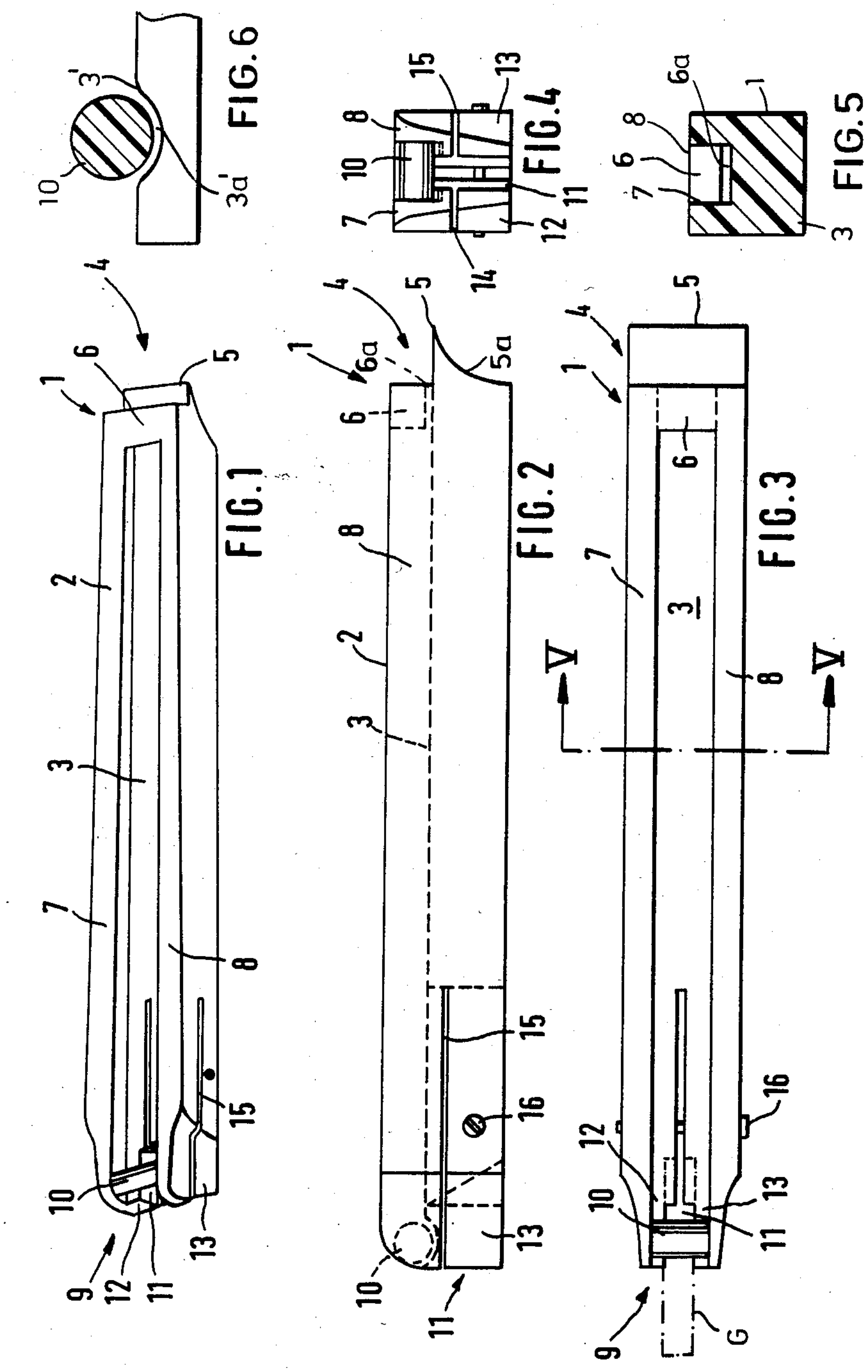
FIG. 1 is a perspective view of a hand tool for applying metal foil strips to the edge of a flat glass article according to the invention.
FIG. 2 is a side view of the tool.
FIG. 3 is a top view of the tool.
FIG. 4 is an end view of the tool as seen at the mouth of the guide hole.
FIG. 5 is a cross sectional view taken along the line V—V of FIG. 3.
FIG. 6 is another cross section illustrating a feature of the invention.

The tool of the invention comprises a handle 1 which is injection molded from synthetic resin and has, as can be seen, a rectangular cross section which, in the embodiment shown, is square. Naturally, it is also possible to form the handle from wood by cutting out or routing the recesses, slots and grooves thereof. Preferably, however, the pressing bar 10 is formed unitarily with a handle although it can be formed independently therefrom and can be a roller. Although in the embodiment illustrated there is a fixed pin.

Along the upper side of the head 1 a planar guide path 3 is formed by recessing the handle. The guide path 3 is slightly greater than the width of the foil to be applied, e.g. a copper foil which is drawn from a roll in which the foil is coiled with a masking strip applied to its adhesive surface.

At the inlet end of the guide path 3 a peeling blade 5 is formed which is defined in part by a curved surface 5*a* and along which the masking strip is peeled off from the foil as it is fed to the left along the guide path 3. The blade 5 can also be located, if desired, substantially at the center of the path. In this case, both the foil and masking strip are guided together over the first portion of the path and only then is the masking strip peeled from the foil.

At the inlet end 4, moreover, a rib 6 is provided between the flanks 7 and 8 of the recess admitting the path 3 so that the foil can be held along the path when it is passed through the slit 6*a* onto the latter.

The rib 6, of course, extends partly over the guide plane and indeed the flanks 7 and 8 can also partly overhang the guide plane to ensure effective guiding of the foil.

At the mouth or discharge end 9 of the path 3 a pressing pin 10 extends between the two flanks 7 and 8 to contact the latter. This pin has a circular cross section and can carry a roller, if desired.

Beneath the pin 10, orthogonal to the guide pin 3, is a guide slot 11 for a glass article which has been illustrated in dot-dash lines at G in FIG. 3.

The guide slot is formed between two resilient cheeks 12 and 13 formed integrally with the handle 1 and separated partly therefrom and from the rigid flanks 7 and 8 by the slits 14 and 15. A tension screw 16 spanning both of these slits can be tightened, draw them together or loosened to separate them apart. This of course ensures that the slot 11 can be adjusted to the width of the glass article.

In use, a portion of a length of the foil is stripped of its masking layer and fed past the blade 5, which peels subsequent portions of the masking layer from the foil and margins of the foil overhanging the edge can be pressed across the broad surfaces of the glass in the usual manner. Crimping and wrinkling are completely avoided. In FIG. 6, I show a modification in which the guide path 3' flanking the slot 11 is formed with a recess 3*a'* into which the pin 10 projects.

I claim:

1. A hand roller for applying an adhesive-backed metal foil to the edge of a flat glass article which comprises:

an elongated handle provided with a guide for said foil;

a blade at one end of said guide for peeling a masking strip away from its adhesive surface of said foil; and pressing means at an opposite end of said guide for pressing said foil against said edge so that an adhesive surface of said foil is adhered to said article, said guide being a planar guide path at least partly recessed in said handle whereby flanks of said handle define said guide path and said handle being formed with at least a portion overhanging said guide path, said blade being formed unitarily on said handle, said pressing means includes a pin having a rounded cross section spanning between the flanks defining said guide path and fixed with respect to said handle, said pin being disposed above a planar guide surface of said path.

2. The hand roller as defined in claim 1 wherein said blade lies in the plane of said guide path.

3. The hand roller as defined in claim 1 wherein said handle is rectangular in cross section.

4. The hand roller as defined in claim 3 wherein said handle has a square cross section.

5. The hand roller as defined in claim 1 wherein said pin has a circular cross section.

6. A hand roller for applying an adhesive-backed metal foil to the edge of a flat glass article which comprises:

an elongated handle provided with a guide for said foil;

a blade at one end of said guide for peeling a masking strip away from its adhesive surface of said foil; and pressing means at an opposite end of said guide for pressing said foil against said edge so that an adhesive surface of said foil is adhered to said article, said guide being a planar guide path at least partly recessed in said handle whereby flanks of said handle define said guide path and said handle being formed with at least a portion overhanging said guide path, said blade being formed unitarily on said handle, said pressing means includes a pin having a rounded cross section spanning between the flanks defining said guide path and fixed with respect to said handle, said guide path being formed with a recess and said pin extends at least partially into said recess.

7. The hand roller as defined in claim 6 wherein said blade lies in the plane of said guide path.

8. The hand roller as defined in claim 6 wherein said handle is rectangular in cross section.

9. The hand roller as defined in claim 6 wherein said pin has a circular cross section.

10. A hand roller for applying an adhesive-backed metal foil to the edge of a flat glass article which comprises:

an elongated handle provided with a guide for said foil;

a blade at one end of said guide for peeling a masking strip away from its adhesive surface of said foil; and pressing means at an opposite end of said guide for pressing said foil against said edge so that an adhesive surface of said foil is adhered to said article, said guide being a planar guide path at least partly recessed in said handle whereby flanks of said handle define said guide path and said handle being formed with at least a portion overhanging said guide path, said blade being formed unitarily on said handle, said pressing means includes a pin having a rounded cross section spanning between the flanks defining said guide path and fixed with respect to said handle, said roller further comprising means defining a guide slot for said edge of said article extending generally orthogonally to said guide path below said pin.

11. The hand roller as defined in claim 10, further comprising means for adjusting the width of said guide slot.

12. The hand roller as defined in claim 11 wherein the means for adjusting the width of said guide slot includes a screw connecting opposite cheeks defining said slot, said cheeks being resiliently displaceable on said handle.

13. The hand roller as defined in claim 10 wherein said handle is composed of a synthetic resin.

14. The hand roller as defined in claim 10 wherein said handle is composed of wood.

15. The hand roller as defined in claim 10 wherein said blade lies in the plane of said guide path.

16. The hand roller as defined in claim 10 wherein said handle is rectangular in cross section.

17. The hand roller as defined in claim 10 wherein said pin has a circular cross section.

* * * * *